(12) United States Patent
Fan et al.

(10) Patent No.: US 11,353,629 B2
(45) Date of Patent: Jun. 7, 2022

(54) ANTI-GLARE FILM AND POLARIZER WITH THE SAME

(71) Applicant: BenQ Materials Corporation, Taoyuan (TW)

(72) Inventors: Gang-Lun Fan, Taoyuan (TW); Wei-Hsien Chen, Taoyuan (TW); Kuo-Hsuan Yu, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 223 days.

(21) Appl. No.: 16/654,061

(22) Filed: Oct. 16, 2019

(65) Prior Publication Data

US 2020/0363561 A1 Nov. 19, 2020

(30) Foreign Application Priority Data

May 16, 2019 (TW) .................. 108116982

(51) Int. Cl.
*G02B 1/111* (2015.01)
*G02B 1/08* (2006.01)
(Continued)

(52) U.S. Cl.
CPC ................ *G02B 1/111* (2013.01); *B32B 5/16* (2013.01); *B32B 27/14* (2013.01); *B32B 27/308* (2013.01); *C08J 7/0427* (2020.01); *C08K 3/36* (2013.01); *G02B 1/08* (2013.01); *G02B 5/305* (2013.01); *B32B 2255/10* (2013.01); *B32B 2255/20* (2013.01); *B32B 2264/102* (2013.01);
(Continued)

(58) Field of Classification Search
CPC ..... G02B 1/00–1/18; G02B 5/02–0294; C09D 133/00–133/26
See application file for complete search history.

(56) References Cited

U.S. PATENT DOCUMENTS

| | | | | |
|---|---|---|---|---|
| 7,806,979 | B2 * | 10/2010 | Chang .................. | C09D 133/08 106/499 |
| 2008/0192353 | A1 * | 8/2008 | Nagahama ........... | G02B 5/0221 359/599 |

(Continued)

FOREIGN PATENT DOCUMENTS

| | | |
|---|---|---|
| CN | 109337106 A | 2/2019 |
| JP | 2019070714 A | 5/2019 |
| TW | 201426030 A | 7/2014 |

OTHER PUBLICATIONS

"Radcure Coating Resins: Product Guide". Allnex Group, (2014); pp. 1-36.*

*Primary Examiner* — Prashant J Khatri

(57) ABSTRACT

An anti-glare film is disclosed. The anti-glare film comprises a poly(methyl methacrylate) (PMMA) base film and an anti-glare layer comprising an acrylic binder resin and organic microparticles, wherein the anti-glare layer comprises an miscible sub-layer adjacent to the interface between the anti-glare layer and the base film for urging the organic microparticles toward the upper portion of the anti-glare layer to form an anti-glare sub-layer with an uneven surface and wherein the average thickness of the miscible layer is at least 40 percent of the total thickness of the anti-glare layer and a ratio of the average thickness of the anti-glare sub-layer to the diameter of the microparticle is between 0.45 to 1.1.

16 Claims, 5 Drawing Sheets

(51) Int. Cl.
*G02B 5/30* (2006.01)
*C08K 3/36* (2006.01)
*B32B 27/14* (2006.01)
*B32B 5/16* (2006.01)
*B32B 27/30* (2006.01)
*C08J 7/04* (2020.01)

(52) U.S. Cl.
CPC ....... *B32B 2307/40* (2013.01); *C08J 2333/12* (2013.01); *C08J 2425/06* (2013.01); *C08J 2433/08* (2013.01); *C08K 2201/011* (2013.01)

(56) References Cited

U.S. PATENT DOCUMENTS

| | | | |
|---|---|---|---|
| 2008/0206458 A1* | 8/2008 | Watanabe | G02B 5/0278 427/163.4 |
| 2009/0015927 A1* | 1/2009 | Matsumura | G02B 5/0268 359/614 |
| 2013/0279155 A1* | 10/2013 | Kuroda | G02B 1/11 362/97.4 |

* cited by examiner

ANTI-GLARE FILM AND POLARIZER WITH THE SAME

CROSS-REFERENCE TO RELATED APPLICATION

This application claims the priority benefit of Taiwanese application serial No. 108116982, filed on, May 16, 2019, which is incorporated herein by reference.

BACKGROUND OF THE INVENTION

The present invention relates to an anti-glare film for display device and a polarizer comprising the same.

As the developing of the display technology, such as cathode ray tube display (CRT), liquid crystal display (LCD), plasma display (PDP), electroluminescent display (ELD), field emission display (FED), organic light emitting diode display (OLED), the demands for the performance of displays such as high contrast, wide viewing angle, high brightness, thinness, large screen dimension, high fine resolution and diversified functions have been widely required.

Displays are often used in environment having ambient lighting, and glare will occur on the display surface caused by reflection. The glare originated from the light external to the display will deteriorate the image quality and visibility. Thus, an optical film, such as an anti-glare film or an anti-reflection film, is adhered on the display surface for modulating the environmental light and reducing the light reflected thereon for preventing the image quality deterioration.

For exhibiting effective anti-glare property but maintaining high contrast of the display image in dark environment, it is suggested to use an anti-glare film containing small organic microparticles for maintaining high contrast of the display image. An anti-glare film containing organic microparticles and nanoparticles coating on a triacetyl cellulose (TAC) film is also suggested in the related state of the art, in which the microparticles and nanoparticles aggregate to form an uneven surface on the film so as to impart anti-glare property thereto. This anti-glare film reduces the glare occurred on the display surface. However, the aggregation of the organic microparticles and nanoparticles in the coating is hard to control and thus, the anti-glare property of the coating may be decreased but the glare property thereof be increased.

Furthermore, TAC film provides a good light transmission and film strength, but the coloring, high moisture absorption and poor weatherability of the TAC film is unfavor to be used on a polarizer which is sensitive to the moisture. It is concerned that TAC film applied on polarizers will cause the change of polarization degree after a long term use. At present, it is suggested to use polyethylene terephthalate (PET) or polymethyl methacrylate (PMMA) instead of TAC film as a base film, both of which have good light transmission and weatherability. However, due to surface properties of PET film and PMMA film, when organic microparticles are coating on the film, the sedimentation of the microparticles occurs as the action of the Stokes' Law, which results in the micorparticles failing to protrude out of the surface of coating and thus, fails to provide desired anti-glare property. To decrease the thickness of the coating on the film in order to expose the microparticles is a way to achieve the desired anti-glare property but the decreased thickness of the coating will result in the insufficient hardness of the coating.

This invention is to provide an anti-glare film with polymethyl methacrylate (PMMA) as a base film, of which the anti-glare property and the hardness are both satisfied.

SUMMARY OF THE INVENTION

This invention is to provide an anti-glare film comprising a polymethyl methacrylate (PMMA) base film and an anti-glare layer. The anti-glare layer comprises acrylate binder resin and organic microparticles, wherein the anti-glare layer comprises an miscible sub-layer adjacent to the interface between the anti-glare layer and the base film for urging the organic microparticles toward the upper portion of the anti-glare layer to form an anti-glare sub-layer with an uneven surface, and wherein the average thickness of the miscible layer is at least 40 percent of the total thickness of the anti-glare sub-layer and preferably is at least 50 percent thereof.

In a preferred embodiment of the present anti-glare film, wherein a ratio of the average thickness of the anti-glare sub-layer to the particle diameter of the microparticle is in the range of 0.45 to 1.1.

In an embodiment of the present anti-glare film, the thickness of the anti-glare layer is in the range of 4 μm to 10 μm, and preferably in the range of 5 μm to 9 μm. The thickness of the anti-glare sub-layer is in the range of 0.5 μm to 5 μm, and preferably in the range of 1 μm to 4 μm.

In an embodiment of the present anti-glare film, wherein the average diameter of the organic microparticles is in the range of 0.5 μm to 6 μm, and preferably is in the range of 1 μm to 5.5 μm.

In a preferred embodiment of the present anti-glare film, the amount of the organic microparticles is in the range of 0.3 weight parts to 14 weight parts with respect to per 100 weight parts of the acrylic binder resin, and preferably is in the range of 0.5 weight parts to 12 weight parts.

In an embodiment of the present anti-glare film, the acrylic binder resin comprises a (meth)acrylate composition and an initiator, wherein the (meth)acrylate composition comprises 35 to 50 weight parts of an urethane (meth) acrylate oligomer with a functionality of 6 to 15; 12 to 20 weight parts of a (meth)acrylate monomer with a functionality of 3 to 6; and 1.5 to 12 weight parts of a (meth)acrylate monomer with a functionality of less than 3, wherein the average molecular weight of the urethane (meth)acrylate oligomer is between 1,000 and 4,500.

In an another preferred embodiment of the present anti-glare film, the anti-glare layer of the anti-glare film can further comprises silica nanoparticles, wherein the primary average diameter (d50) of the silica nanoparticles is in the range of 5 nm to 120 nm and preferably in the range of 5 nm to 100 nm.

Another aspect of the present anti-glare film is to provide a method for preparing an anti-glare film. The method comprises the steps of mixing the acrylic binder resin and the organic microparticles to prepare an anti-glare solution; applying the anti-glare solution onto the PMMA base film; heating the PMMA base film with anti-glare coating until the temperature of the base film surface to be in the range of 70° C. to 120° C., and preferably in the range of 80° C. to 120° C., and more preferably in the range of 90° C. to 120° C.; and curing the coating layer by radiation or electron beam for forming an anti-glare film.

A further object of the present invention is to provide a polarizer comprising a polarizing element and the present anti-glare film.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details.

It is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The term "(meth)acrylate" used herein refers to acrylate or (meth)acrylate.

Figure 1:
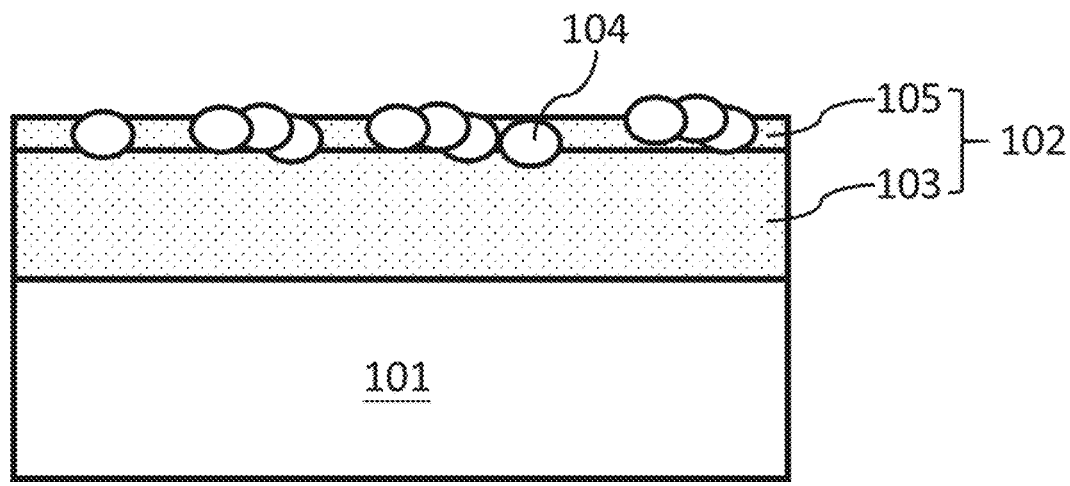
FIG. 1 is a cross-sectional view showing an anti-glare film according to an embodiment of the present invention.

The present disclosure is to provide an anti-glare film. FIG. 1 is a cross-sectional view showing an anti-glare film according to an embodiment of the present invention. As shown in FIG. 1, the anti-glare film 10 comprises a PMMA base film 101 and an anti-glare layer 102 with uneven surface 102A thereon. In an embodiment of the present invention, the light transmittance of the PMMA base film is more than 80% and preferably is more than 90%. The thickness of the PMMA base film used in the present is ranging between 10 µm and 100 µm, and preferably is ranging between 20 µm and 80 µm.

In the present anti-glare film 10, the anti-glare layer 102 comprises a binder resin (not shown) and organic microparticles 104, wherein the anti-glare layer 102 comprises a miscible sub-layer 103 adjacent to the interface between the anti-glare layer and the PMMA base film 101. The miscible sub-layer 103 urges the organic microparticles 104 toward the upper portion of the anti-glare layer to form an anti-glare sub-layer 105, the organic microparticles 104 result in an uneven surface 102A of the anti-glare layer 102 to impart the anti-glare property. The average thickness of the miscible sub-layer 103 is at least 40 percent of the total thickness of the anti-glare sub-layer and preferably is at least 50 percent thereof.

In an embodiment of the present invention, the thickness of the anti-glare layer 102 is ranging from 4 µm to 10 µm, and is preferably from 5 µm to 9 µm. In the present anti-glare film 10, because the formation of the miscible sub-layer 103 can be used to effectively control the position of the organic microparticles 104 in the anti-glare layer 102, the organic microparticles 104 are urged up to the anti-glare sub-layer 105 of the anti-glare layer 102 to form an uneven surface 102A to impart anti-glare property to the anti-glare layer 102. Thus, the thickness of the anti-glare layer to reduce is not needed to be reduced, as the reduction of the thickness of the layer results in the insufficient hardness of the layer.

In the anti-glare layer 102 of the present anti-glare film 10, the average thickness of the anti-glare sub-layer 105 is in the range of 0.5 µm to 5 µm, and preferably in the range of 1 µm to 4 µm, the particle diameter of the organic microparticles 104 is in the range of 0.5 µm to 6 µm, and preferably in the range of 1 µm to 5.5 µm. The ratio of the average thickness of the anti-glare sub-layer 105 to the particle diameter of the microparticles 104 is in the range of 0.45 to 1.1.

In a preferred embodiment of the present anti-glare film, when the total haze of the anti-glare film 10 is lower, such as less than 10%, it is preferred to use organic microparticles 104 of smaller particle diameter, for example, the particle diameter of the organic microparticles 104 is in the range of 0.5 µm to 4 µm, and preferably in the range of 1 µm to 3.5 µm, and the ratio of the average thickness of the anti-glare sub-layer 105 to the average particle diameter of the organic microparticles 104 is in the range of 0.65 to 1.1, and is preferably is in the range of 0.7 and 1.1. In another preferred embodiment of the anti-glare film of the present invention, when the total haze of the anti-glare film 10 is higher, such as more than 10%, it is preferred to use organic microparticles 104 of particle diameter, for example, in the range of 1 µm to 6 µm, and preferably in the range of 1.5 µm to 5.5

µm, and the ratio of the average thickness of the anti-glare sub-layer 105 to the average particle diameter of the organic microparticles 104 is in the range of 0.45 to 1, and is preferably is in the range of 0.5 and 0.9. Therefore, the total haze of the present anti-glare film 102 can be adjusted by the ratio of the average thickness of the anti-glare sub-layer 105 to the average particle diameter of the organic microparticles 104.

The anti-glare property of the present anti-glare film is varied with the reflective index of the organic microparticles 104 and the use amount thereof in the layer. The suitable organic microparticles 104 are the microparticles with the reflective index in the range of 1.4 to 1.6. The use amount of the organic microparticles is in the range of 0.3 weight parts to 14 weight parts with respect to per 100 weight parts of the acrylic binder resin, and preferably is in the range of 0.5 weight parts to 12 weight parts.

The organic microparticles 104 suitably used in the anti-glare layer 102 of the anti-glare film 10 can be hydrophilic-modified polymethyl methacrylate microparticles, polystyrene microparticles, styrene-methyl methacrylate copolymer microparticles, polyethylene microparticles, epoxy resin microparticles, polysilicone microparticles, polyvinylidene fluoride or polyvinyl fluoride microparticle. The surface of the organic microparticles 104 can be optionally hydrophilic-modified by 2-hydroxyethyl (meth)acrylate (2-HE(M)A) or (meth)acrylonitrile, but not limited thereto. In a preferred embodiment of the present invention, it is preferred to use hydrophilic-modified polymethyl methacrylate microparticles, polystyrene microparticles, or styrene-methyl methacrylate copolymer microparticles.

In the present anti-glare film 10, the acrylate binder resin used in the anti-glare layer 102 comprises a (meth)acrylate composition and an initiator, wherein the (meth)acrylate composition comprises a polyurethane (meth)acrylate oligomer with a functionality of 6 to 15, at least one (meth)acrylate monomer with a functionality of 3 to 6, at least one (meth)acrylate monomer with a functionality of less than 3, wherein the average molecular weight of the polyurethane (meth)acrylate oligomer is ranging between 1,000 and 4,500.

In a preferred embodiment of the present invention, the (meth)acrylate composition of the acrylate binder resin comprises 35 to 50 weight parts of the polyurethane (meth)acrylate oligomer with a functionality of 6 to 15, 12 to 20 weight parts of the at least one (meth)acrylate monomer with a functionality of 3 to 6, and 1.5 to 12 weight parts of the at least one (meth)acrylate monomer with a functionality of less than 3

In an embodiment of the present invention, the number molecular weight of the polyurethane (meth)acrylate oligomer with the functionality of 6 to 15 is no less than 1,000 and preferably between 1,500 and 4,500. In a preferred embodiment of the present invention, the polyurethane (meth)acrylate oligomer with the functionality of 6 to 15 is preferably an aliphatic polyurethane (meth)acrylate oligomer with the functionality of 6 to 15.

In an embodiment of the present invention, the number molecular weight of the (meth)acrylate monomer with a functionality of 3 to 6 is less than 1,000 and preferably less than 800. The suitable (meth)acrylate monomer with a functionality of 3 to 6 used in the present invention can be, but not limited to, for example, selected from at least one of the group consisting of pentaerythritol tetra(meth)acrylate (PETE(M)A), dipentaerythritolpenta(meth)acrylate (DPP(M)A), dipentaerythritolhexa(meth)acrylate (DPH(M)A), trimethylolpropane tri(meth)acrylate (TMPT(M)A), ditrimethylolpropane tetra(meth)acrylate (DTMPT(M)A), pentaerythritol tri(meth)acrylate (PET(M)A) or the combination thereof. The (meth)acrylate monomer with a functionality of 3 to 6 can be one of pentaerythritol triacrylate (PETA), dipentaerythritol hexaacrylate (DPHA) and dipentaerythritol pentaacrylate (DPPA), or combinations thereof.

In an embodiment of the present invention, the (meth)acrylate monomer with functionality of less than 3 can be a (meth)acrylate monomer with a functionality of 1 or 2 and a molecular weight of less than 500. The suitable (meth)acrylate monomer with functionality of less than 3 for the present invention can be but not limited to, for example, selected from at least one of the consisting of 2-ethylhexyl (meth)acrylate (2-EH(M)A), 2-hydroxyethyl (meth)acrylate (2-HE(M)A), 2-hydroxypropyl (meth)acrylate(2-HP(M)A), 2-hydroxybutyl (meth)acrylate(2-HB(M)A), 2-butoxyethyl (meth)acrylate, 1,6-hexanediol di(meth)acrylate (HDD(M)A), cyclic trimethylolpropane formal (meth)acrylate (CTF(M)A), 2-phenoxyethyl (meth)acrylate (PHE(M)A), tetrahydrofurfuryl (meth)acrylate (THF(M)A), lauryl (meth)acrylate (L(M)A), diethylene glycol di(meth)acrylate (DEGD(M)A), dipropylene glycol di(meth)acrylate (DPGD(M)A), tripropylene glycol di(meth)acrylate (TPGD(M)A), isobornyl (meth)acrylate (IBO(M)A) or the combination thereof. The (meth)acrylate monomer with functionality of less than 3 can be one of 1,6-hexanediol diacrylate (HDDA), cyclic trimethylolpropane formal acrylate (CTFA) and 2-phenoxyethyl acrylate (PHEA), or combinations thereof.

The initiator suitably used in the hard coating layer film of the present invention can be those commonly used in the related art, such as, for example, but not limited to, acetophenones, diphenylketones, propiophenones, benzophenones, α-hydroxyketones, fluorenylphosphine oxides or the like. The initiator can be used alone or together.

In another embodiment of the present invention, the hard coating solution can be optionally added with an antistatic agent, a colorant, a flame retardant, a UV absorber, an antioxidant, a surface modifier and the like.

In a preferred embodiment of the present anti-glare film, as the average particle diameter of the organic microparticles 104 is less than 2 µm, silica nanoparticles (not shown in the drawings) can be optionally added in the anti-glare layer 102 to increase the agglomeration of the organic microparticles 104. The primary particle diameter (d50) of the suitable silica nanoparticles is in the range of 5 nm to 120 nm and preferably in the range of 5 nm to 100 nm. The use amount of the silica nanoparticles in the anti-glare layer 102 is in the range of 1 weight parts to 3 weight parts with respect to per 100 weight parts of the acrylic binder resin, and preferably in the range of 1.5 weight parts to 2.5 weight parts.

The anti-glare film of the present invention can be optionally coated with other functional films, such as a low reflective film to provide anti-reflection property.

Another aspect of the present invention is to provide a method for preparing the anti-glare film.

The method for preparing the present anti-glare film comprises the steps of mixing a (meth)acrylate composition comprises a polyurethane (meth)acrylate oligomer with a functionality of 6 to 15, at least one (meth)acrylate monomer with a functionality of 3 to 6, at least one (meth)acrylate monomer with a functionality of less than 3, an initiator and adequate solvent(s) and stirred evenly for preparing a acrylate binder resin; adding organic microparticles and/or silica nanoparticles and organic solvents into the acrylate binder resin with stirring evenly for preparing an anti-glare solution; and coating the anti-glare solution on a PMMA base film. The base film coated with anti-glare solution is heated until the temperature of the base film surface to be in the range of 70° C. to 120° C., and preferably in the range of 80° C. to 120° C., and more preferably in the range of 90° C. to 120° C., and curing the coating layer by radiation or electron beam for forming an anti-glare film.

In the present method for preparing the anti-glare film, after the PMMA base film is coated with anti-glare solution, the coated base film is heated until the temperature of the base film surface reaches to the range of 70° C. to 120° C. During elevating the temperature of the coated base film, the solvent in the anti-glare coating is expelled and removed but the viscosity of the anti-glare coating is decreased to result in the miscible interaction between the surface of the PMMA base film and the anti-glare coating to form a miscible sub-layer. The heated coated is subsequently cured by radiation or electron beam as the cured miscible sub-layer urges the organic microparticles and/or silica nanoparticles in the anti-glare coating up to the upper portion adjacent to the surface of the anti-glare layer to form an uneven surface of the anti-glare layer.

The solvents suitable for preparation of the present anti-glare film can be the organic solvents commonly used in the related art, such as ketones, aliphatic, cycloaliphatic or aromatic hydrocarbons, ethers, esters or alcohols. The acrylic resin binder and anti-glare solution can use one or one more organic solvents. The suitable solvent can be such as, acetone, butanone, cyclohexanone, methyl isobutyl ketone, hexane, cyclohexane, dichloromethane, dichloroethane, toluene, xylene, propylene glycol methyl ether, methyl acetate, ethyl acetate, acetic acid propyl ester, butyl acetate, n-butanol, isobutanol, isopropanol, diacetone alcohol, propylene glycol methyl ether acetate, cyclohexanol or tetrahydrofuran and the like.

The present anti-glare solution can be applied to the base film surface by any usual method in the related art, for example, bar coating, doctor blade coating, dip coating, roll coating, spinning coating, slot-die coating and the like.

The further object of the present invention is to provide a polarizer comprising a polarizing element, wherein the surface of the polarizing element comprises the present anti-glare film.

The present invention will be described below with reference to Examples to describe the present invention in detail but the present invention is not limited to the description thereof.

EXAMPLE

Preparation Example 1

Preparation of Binder Resin I 39 weight parts of polyurethane acrylate oligomer (functionality 9, molecular weight about 2,000, viscosity of about 86,000 cps (at 25° C.), commercially obtained from Allnex, USA), 4.5 weight parts of PETA, 10.5 weight parts of DPHA, 4.5 weight parts of HDDA, 1.5 weight parts of PHEA, 3.5 weight parts of photo initiator (Chemcure-184, commercially obtained from Chembridge, Taiwan), 0.5 weight parts of photo initiator (TR-PPI-one, Tronly New Electronic Materials, Hong Kong), 24.5 weight parts of ethyl acetate (EAC) and 10 weight parts of n-butyl acetate (nBAC) were mixed and stirred for 1 hour to prepare binder resin I.

Preparation Example 2

Preparation of Binder Resin II 39 weight parts of polyurethane acrylate oligomer (functionality 9, molecular weight about 2,000, viscosity of about 86,000 cps (at 25° C.), commercially obtained from Allnex, USA), 4.5 weight parts of PETA, 12.0 weight parts of DPHA, 6.0 weight parts of CTFA, 4.0 weight parts of photo initiator (Chemcure-184, commercially obtained from Chembridge, Taiwan), 24.5 weight parts of ethyl acetate (EAC) and 10 weight parts of n-butyl acetate (nBAC) were mixed and stirred for 1 hour to prepare binder resin II.

Preparation Example 3

Preparation of Binder Resin III 39 weight parts of polyurethane acrylate oligomer (functionality 9, molecular weight about 2,000, viscosity of about 86,000 cps (at 25° C.), commercially obtained from Allnex, USA), 4.5 weight parts of PETA, 12.0 weight parts of DPHA, 6.0 weight parts of HDDA, 3.5 weight parts of photo initiator (Chemcure-184, commercially obtained from Chembridge, Taiwan), 0.5 weight parts of photo initiator (TR-PPI-one, commercially obtained from Tronly New Electronic Materials, Hong Kong), 24.5 weight parts of ethyl acetate and (EAC) and 10 weight parts of n-butyl acetate (nBAC) were mixed and stirred for 1 hour to prepare a binder resin III.

Example 1

Preparation of Anti-Glare Film 300 weight parts of binder resin I prepared in Example 1, 5.44 weight parts of reactive silica nanoparticles dispersion (MEK-5630X, solid content 30%, solvent: butanone, commercially obtained from EUSIL, Taiwan), 2.01 weight parts of hydrophobic silica nanoparticles dispersion (NanoBYK-3650, solid content 30%, solvent: methoxypropyl acetate/methoxy propanol, commercially obtained from BYK, Germany), 15.5 weight parts of acrylate leveling agent (BYK-UV3535, solid content 10%, solvent: ethyl acetate, commercially obtained from BYK, Germany), 3.27 weight parts of polystyrene particles (SX-130H, average particle diameter of 1.3 μm, refraction index 1.59, commercially obtained from Soken Chemical & Engineering, Japan), 108.7 weight parts of ethyl acetate and 141.3 weight parts of n-butyl acetate were mixed and stirred for 1 hour to evenly disperse and prepare an anti-glare solution.

Figure 2:
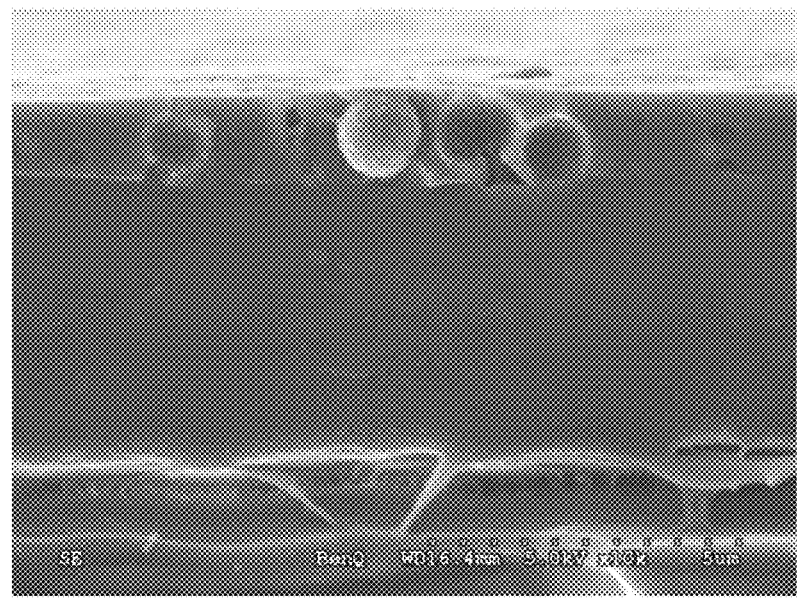
FIG. 2 shows a scanning electron microscopic (SEM) image (magnification ratio of 10,000 times) of a cross-sectional view of the anti-glare film of Example 1 according to the present invention.

The anti-glare solution was coated on a PMMA base film with a thickness of 40 μm. The coated film was heated in 100° C. oven until the temperature of the film surface was reached 96° C. and then, the coated film was cured by exposing to UV light in an amount of 80 mJ/cm$^2$ under nitrogen atmosphere to obtain an anti-glare layer with a thickness of 6.06 μm. The obtained anti-glare film was observed by scanning electron microscope (SEM) and the average thickness of the miscible sub-layer was measured. A SEM image (magnification ratio of 10,000 times) of the cross-sectional view of the anti-glare film was taken as shown in FIG. 2, the thickness of the miscible sub-layer was measured to be 4.65 μm.

The light transmittance, haze, glossiness, and anti-glare evaluation of the obtained anti-glare film were conducted. The results were shown in Table 1.

Example 2

Preparation of Anti-Glare Film

The anti-glare solution was prepared in the same manner as in Example 1, except for that the polystyrene particles was replaced by polymethyl methylacrylate particles with an average particle diameter of 1.5 μm and a refraction index of 1.49 (MX-150, commercially obtained from Soken Chemical & Engineering, Japan).

Figure 3:
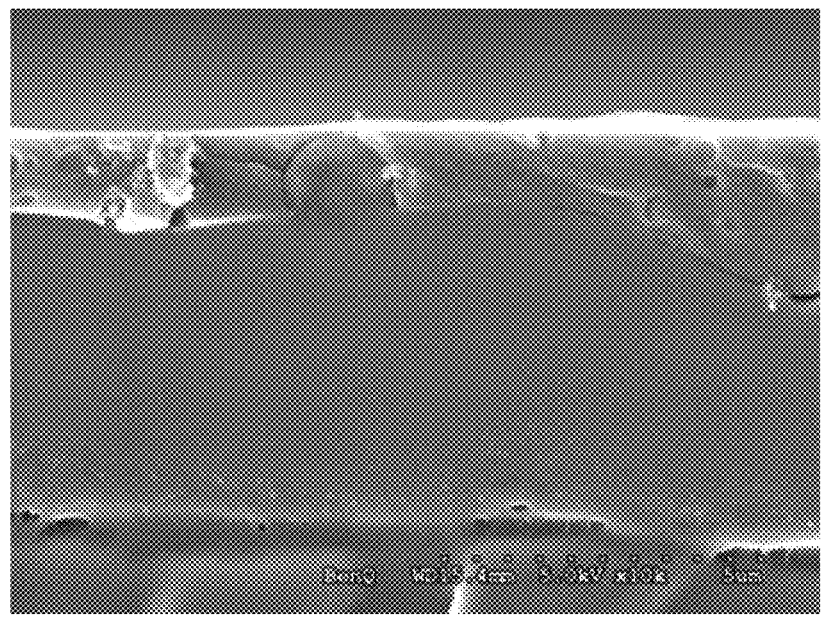
FIG. 3 shows a SEM image (magnification 10,000 times) of a cross-sectional view of the anti-glare film of Example 2 according to the present invention.

The anti-glare solution was coated on a PMMA base film with a thickness of 40 μm. The coated film was heated in 100° C. oven until the temperature of the film surface was reached 98° C. and then, the coated film was cured by exposing to UV light in an amount of 80 mJ/cm$^2$ under nitrogen atmosphere to obtain an anti-glare layer with thickness of 6.58 μm. The obtained anti-glare film was observed by scanning electron microscope (SEM) and the average thickness of the miscible sub-layer was measured. A SEM image (magnification ratio of 10,000 times) of the cross-sectional view of the anti-glare film was taken as shown in FIG. 3, the thickness of the miscible sub-layer was measured to be 5.12 μm.

The light transmittance, haze, glossiness, and anti-glare evaluation of the obtained anti-glare film were conducted. The results were shown in Table 1.

Example 3

Preparation of Anti-Glare Film

The anti-glare solution was prepared in the same manner as in Example 1, except for that the polystyrene particles was replaced by polymethyl methylacrylate particles with an average particle diameter of 1.8 μm and a refraction index of 1.49 (MX-180TA, commercially obtained from Soken Chemical & Engineering, Japan).

Figure 4:
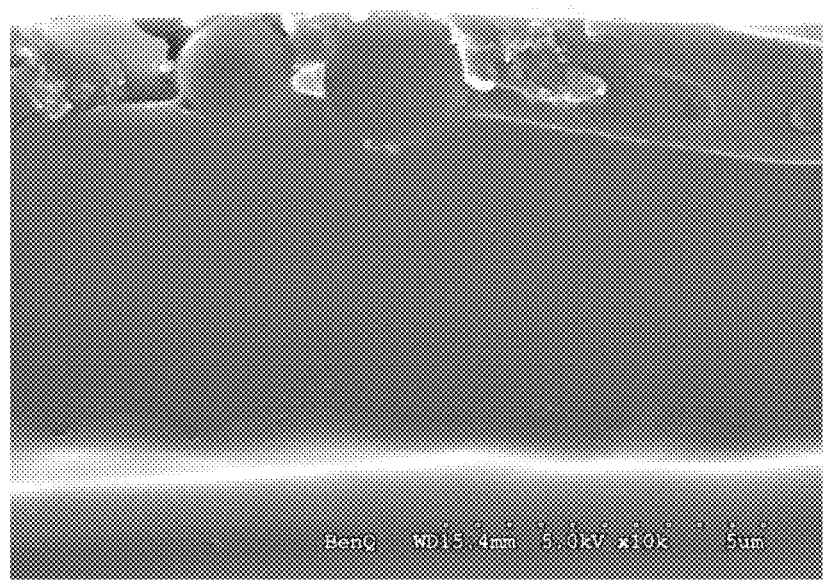
FIG. 4 shows a SEM image (magnification 10,000 times) of a cross-sectional view of the anti-glare film of Example 3 according to the present invention.

The anti-glare solution was coated on a PMMA base film with a thickness of 40 μm. The coated film was heated in 100° C. oven until the temperature of the film surface was reached 96° C. and then, the coated film was cured by exposing to UV light in an amount of 80 mJ/cm$^2$ under nitrogen atmosphere to obtain an anti-glare layer with thickness of 5.91 μm. The obtained anti-glare film was observed by scanning electron microscope (SEM) and the average thickness of the miscible sub-layer was measured. A SEM image (magnification ratio of 10,000 times) of the cross-sectional view of the anti-glare film was taken as shown in FIG. 4, the thickness of the miscible sub-layer was measured to be 4.37 μm.

The optical property measurement and the anti-glare evaluation of the obtained anti-glare film were conducted in accordance with the procedures in Example 1. The results were listed in Table 1.

Example 4

Preparation of Anti-Glare Film

Figure 5:
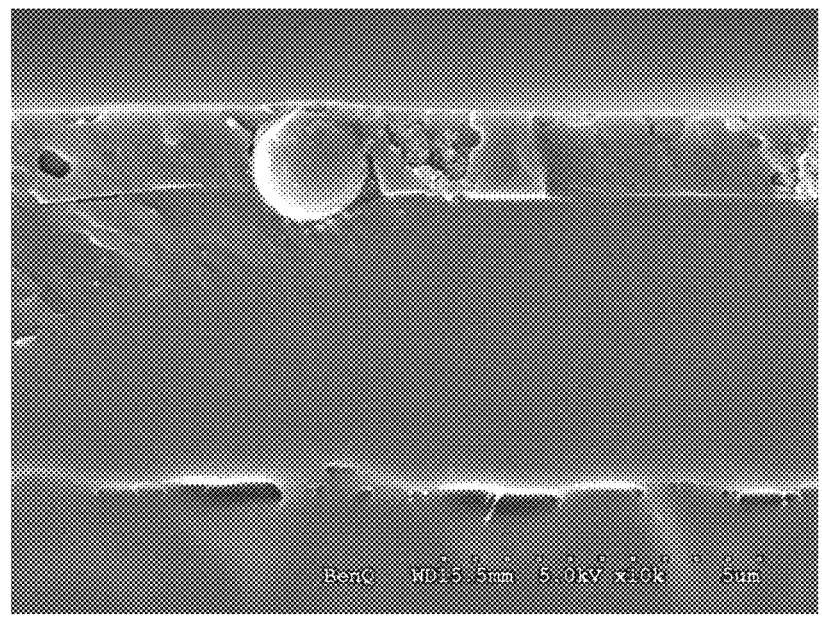
FIG. 5 shows a SEM image (magnification 10,000 times) of a cross-sectional view of the anti-glare film of Example 4 according to the present invention.

The anti-glare solution was prepared in the same manner as in Example 1, except for using styrene-methyl methylacrylate copolymer particles with an average particle diameter of 2 μm and a refraction index of 1.515 (SSX-C02QFE, commercially obtained from Sekisui Plastics, Japan). An anti-glare layer with thickness 6.09 μm on PMMA base film was obtained. The obtained anti-glare film was observed by scanning electron microscope (SEM) and the average thickness of the miscible sub-layer was measured. A SEM image (magnification ratio of 10,000 times) of the cross-sectional view of the anti-glare film was taken as shown in FIG. 5, the thickness of the miscible sub-layer was measured to be 4.52 μm.

The optical property measurement and the anti-glare evaluation of the obtained anti-glare film were conducted in accordance with the procedures in Example 1. The results were listed in Table 1.

Example 5

Preparation of Anti-Glare Film

The anti-glare solution was prepared in the same manner as in Example 1, except for using 1.64 weight parts of styrene-methyl methylacrylate-copolymer particles with average particle diameter of 2 μm and refraction index of 1.555 (SSX-A02RFE, commercially obtained from Sekisui Plastics, Japan). An anti-glare layer with a thickness 6.44 μm on PMMA base film was obtained. The obtained anti-glare film was observed by scanning electron microscope (SEM) and the average thickness of the miscible sub-layer was measured. The thickness of the miscible sub-layer was measured to be 4.92 μm.

The optical property measurement and the anti-glare evaluation of the obtained anti-glare film were conducted in accordance with the procedures in Example 1. The results were listed in Table 1.

Example 6

Preparation of Anti-Glare Film 300 weight parts of binder resin I prepared in Example 1, 2.01 weight parts of hydrophobic silica nanoparticles dispersion (NanoBYK-3650), 15.5 weight parts of acrylate leveling agent (BYK-UV3535), 6.54 weight parts of styrene-methylacrylate-copolymer particles (SSX-103DXE, average particle diameter of 3 μm, refraction index 1.525, commercially obtained from Sekisui Plastics, Japan), 108.7 weight parts of ethyl acetate and 141.3 weight parts of n-butyl acetate were mixed and stirred for 1 hour to evenly disperse and prepare an anti-glare solution.

The anti-glare solution was coated on a PMMA base film with a thickness of 40 μm. The coated film was heated in 100° C. oven until the temperature of the film surface was reached 96° C. and then, the coated film was cured by exposing to UV light in an amount of 80 mJ/cm$^2$ under nitrogen atmosphere to obtain an anti-glare layer with thickness of 7.26 μm. The obtained anti-glare film was observed by scanning electron microscope (SEM) and the average thickness of the miscible sub-layer was measured. The thickness of the miscible sub-layer was measured to be 5.08 μm.

The optical property measurement and the anti-glare evaluation of the obtained anti-glare film were conducted in accordance with the procedures in Example 1. The results were listed in Table 1.

Example 7

Preparation of Anti-Glare Film

Figure 6:
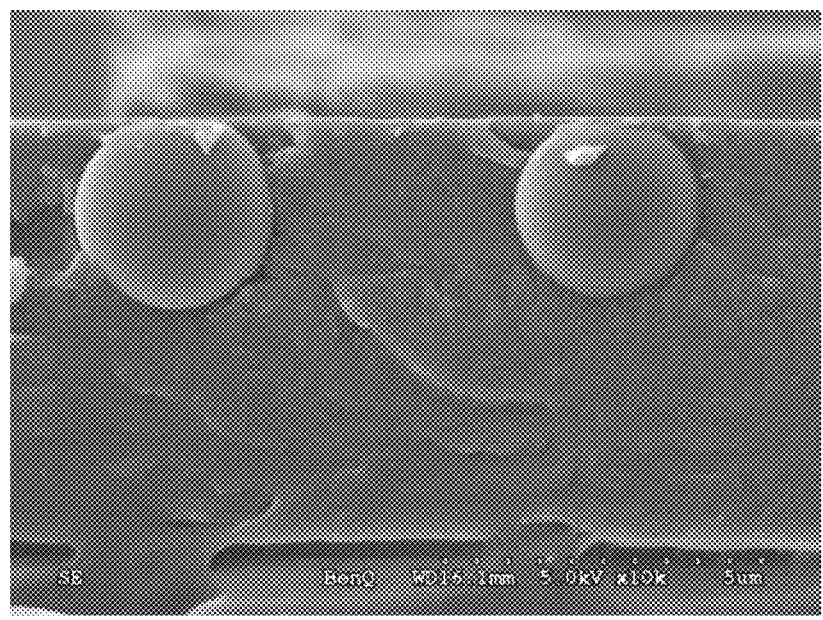
FIG. 6 shows a SEM image (magnification 10,000 times) of a cross-sectional view of the anti-glare film of Example 7 according to the present invention.

The procedures of this Example were the same as Example 6, except for that the coated film was heated in 100° C. oven until the temperature of the film surface was reached 72° C. and then, the coated film was cured by exposing to UV light in an amount of 80 mJ/cm$^2$ under nitrogen atmosphere to obtain an anti-glare layer with thickness of 6.7 μm. The obtained anti-glare film was observed by scanning electron microscope (SEM) and the average thickness of the miscible sub-layer was measured. A SEM image (magnification ratio of 10,000 times) of the cross-sectional view of the anti-glare film was taken as shown in FIG. 6, the thickness of the miscible sub-layer was measured to be 4.24 μm.

The optical property measurement and the anti-glare evaluation of the obtained anti-glare film were conducted in accordance with the procedures in Example 1. The results were listed in Table 1.

Example 8

Preparation of Anti-Glare Film

The procedures of this Example were the same as Example 4, except for that the binder resin I was replaced by 300 weight parts of the binder resin II prepared in Preparation Example 2.

The anti-glare solution was coated on a PMMA base film with a thickness of 40 μm. The coated film was heated in 100° C. oven until the temperature of the film surface was reached 96° C. and then, the coated film was cured by exposing to UV light in an amount of 80 mJ/cm$^2$ under nitrogen atmosphere to obtain an anti-glare layer with thickness of 6.03 μm. The obtained anti-glare film was observed by scanning electron microscope (SEM) with magnification ratio of 10,000 times and the average thickness of the miscible sub-layer was measured to be 4.42 μm.

The optical property measurement and the anti-glare evaluation of the obtained anti-glare film were conducted in accordance with the procedures in Example 1. The results were listed in Table 1.

Example 9

Preparation of Anti-Glare Film

The procedures of this Example were the same as Example 4, except for that the binder resin I was replaced by 300 weight parts of the binder resin III prepared in Preparation Example 3.

The anti-glare solution was coated on a PMMA base film with a thickness of 40 μm. The coated film was heated in 100° C. oven until the temperature of the film surface was reached 96° C. and then, the coated film was cured by exposing to UV light in an amount of 80 mJ/cm$^2$ under nitrogen atmosphere to obtain an anti-glare layer with thickness 5.93 μm. The obtained anti-glare film was observed by scanning electron microscope (SEM) with magnification ratio of 10,000 times and the average thickness of the miscible sub-layer was measured to be 4.27 μm.

Example 10

Preparation of Anti-Glare Film

The procedures of this Example were the same as Example 5, except for using 3.27 weight parts of styrene-methyl methylacrylate-copolymer particles in anti-glare solution.

The anti-glare solution was coated on a PMMA base film with a thickness of 40 μm. The coated film was heated in 120° C. oven until the temperature of the film surface was reached 114° C. and then, the coated film was cured by exposing to UV light in an amount of 80 mJ/cm$^2$ under nitrogen atmosphere to obtain an anti-glare layer with thickness of 7.36 μm. The obtained anti-glare film was observed by scanning electron microscope (SEM) with magnification ratio of 10,000 times and the average thickness of the miscible sub-layer was measured to be 6.35 μm.

The optical property measurement and the anti-glare evaluation of the obtained anti-glare film were conducted in accordance with the procedures in Example 1. The results were listed in Table 1.

Example 11

Preparation of Anti-Glare Film

The anti-glare solution was prepared in the same manner as in Example 1, except for that the polystyrene particles in anti-glare solution were replaced by 6.54 weight parts of the polystyrene particles with an average particle diameter of 2 μm and a refraction index of 1.59 (SSX-302ABE, commercially obtained from Sekisui Plastics, Japan).

Figure 7:
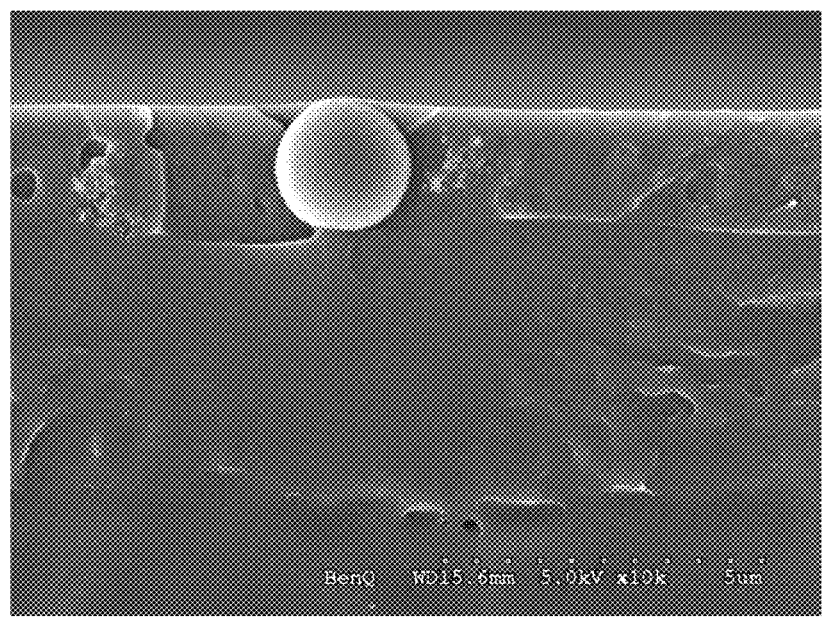
FIG. 7 shows a SEM image (magnification ratio of 10,000 times) of a cross-sectional view of the anti-glare film of Example 11 according to the present invention.

The anti-glare solution was coated on a PMMA base film with a thickness of 40 μm. The coated film was heated in 100° C. oven until the temperature of the film surface was reached 96° C. and then, the coated film was cured by exposing to UV light in an amount of 80 mJ/cm$^2$ under nitrogen atmosphere to obtain an anti-glare layer with thickness of 6.61 μm. The obtained anti-glare film was observed by scanning electron microscope (SEM) and the average thickness of the miscible sub-layer was measured. A SEM image (magnification ratio of 10,000 times) of the cross-sectional view of the anti-glare film was taken as shown in FIG. 7, the thickness of the miscible sub-layer was measured to be 4.84 μm.

The optical property measurement and the anti-glare evaluation of the obtained anti-glare film were conducted in accordance with the procedures in Example 1. The results were listed in Table 1.

Example 12

Preparation of Anti-Glare Film

The procedures of this Example were the same as Example 6, except for that the styrene-methyl methylacrylate-copolymer particles in the anti-glare solution were replaced by polystyrene particles with average diameter of 3 μm and refraction index of 1.59 (SSX-303ABE, commercially obtained from Sekisui Plastics, Japan).

Figure 8:
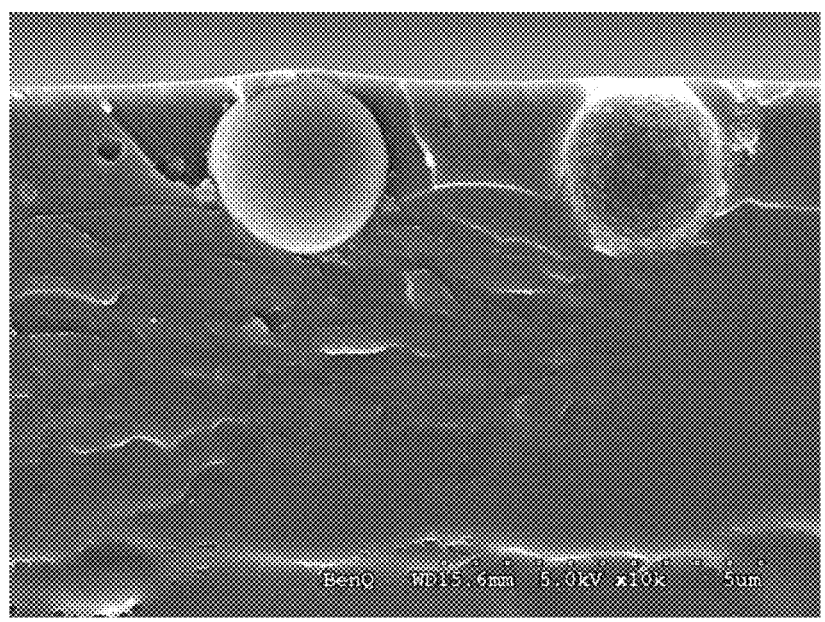
FIG. 8 shows a SEM image (magnification ratio of 10,000 times) of a cross-sectional view of the anti-glare film of Example 12 according to the present invention.

The anti-glare solution was coated on a PMMA base film with a thickness of 40 μm. The coated film was heated in 100° C. oven until the temperature of the film surface was reached 96° C. and then, the coated film was cured by exposing to UV light in an amount of 80 mJ/cm$^2$ under nitrogen atmosphere to obtain an anti-glare layer with thickness of 7.54 μm on PMMA base film was obtained. The obtained anti-glare film was observed by scanning electron microscope (SEM) and the average thickness of the miscible sub-layer was measured. A SEM image (magnification ratio of 10,000 times) of the cross-sectional view of the anti-glare film was taken as shown in FIG. 8, the thickness of the miscible sub-layer was measured to be 5.56 μm.

The optical property measurement and the anti-glare evaluation of the obtained anti-glare film were conducted in accordance with the procedures in Example 1. The results were listed in Table 1.

Example 13

Preparation of Anti-Glare Film

The procedures of this Example were the same as Example 12, except for using 9 weight parts of polystyrene particles in anti-glare solution.

The anti-glare solution was coated on a PMMA base film with a thickness of 40 μm. The coated film was heated in 100° C. oven until the temperature of the film surface was reached 96° C. and then, the coated film was cured by exposing to UV light in an amount of 80 mJ/cm$^2$ under nitrogen atmosphere to obtain an anti-glare layer with thickness of 7.72 μm. The obtained anti-glare film was observed by scanning electron microscope (SEM) with magnification ratio of 10,000 times and the average thickness of the miscible sub-layer was measured. The thickness of the miscible sub-layer was measured to be 5.20 μm.

The optical property measurement and the anti-glare evaluation of the obtained anti-glare film were conducted in accordance with the procedures in Example 1. The results were listed in Table 1.

Example 14

Preparation of Anti-Glare Film

The procedures of this Example were the same as Example 12, except for that the polystyrene particles in anti-glare solution were replaced by 17.58 weight parts of the polystyrene particles with average particle diameter of 3.5 μm and refraction index of 1.59 (SX-350H, commercially obtained from Soken Chemical & Engineering, Japan).

The anti-glare solution was coated on a PMMA base film with a thickness of 40 μm. The coated film was heated in 100° C. oven until the temperature of the film surface was reached 96° C. and then, the coated film was cured by exposing to UV light in an amount of 80 mJ/cm$^2$ under nitrogen atmosphere to obtain an anti-glare layer with thickness of 8.15 μm. The obtained anti-glare film was observed by scanning electron microscope (SEM) with magnification ratio of 10,000 times and the average thickness of the miscible sub-layer was measured to be 5.67 μm.

The optical property measurement and the anti-glare evaluation of the obtained anti-glare film were conducted in accordance with the procedures in Example 1. The results were listed in Table 1.

Example 15

Preparation of Anti-Glare Film

The anti-glare solution was prepared in the same manner as in Example 14, except for that the polystyrene particles in anti-glare solution were replaced by styrene-methyl methylacrylate-copolymer particles with average particle diameter of 4 μm and refraction index of 1.525 (SSX-104DXE, commercially obtained from Sekisui Plastics, Japan).

Figure 9:
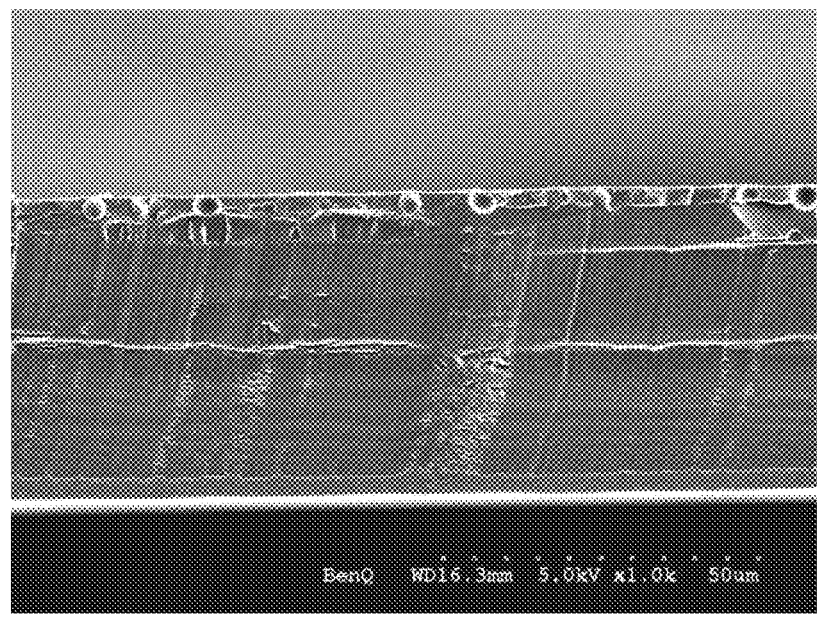
FIG. 9 shows a SEM image (magnification ratio of 10,000 times) of a cross-sectional view of the anti-glare film of Example 15 according to the present invention.

The anti-glare solution was coated on a PMMA base film with a thickness of 40 μm. The coated film was heated in 100° C. oven until the temperature of the film surface was reached 96° C. and then, the coated film was cured by exposing to UV light in an amount of 80 mJ/cm$^2$ under nitrogen atmosphere to obtain an anti-glare layer with thickness of 7.51 μm. The obtained anti-glare film was observed by scanning electron microscope (SEM) and the average thickness of the miscible sub-layer was measured. A SEM image (magnification ratio of 10,000 times) of the cross-sectional view of the anti-glare film was taken as shown in FIG. 9, the thickness of the miscible sub-layer was measured to be 5.19 μm.

The optical property measurement and the anti-glare evaluation of the obtained anti-glare film were conducted in accordance with the procedures in Example 1. The results were listed in Table 1.

Example 16

Preparation of Anti-Glare Film

The procedures of this Example were the same as Example 12, except for that the binder resin I was replaced by the binder resin II prepared in Preparation Example 2 and 17.58 weight parts of polystyrene particles were used in the anti-glare solution.

The anti-glare solution was coated on a PMMA base film with a thickness of 40 μm. The coated film was heated in 100° C. oven until the temperature of the film surface was reached 96° C. and then, the coated film was cured by exposing to UV light in an amount of 80 mJ/cm$^2$ under nitrogen atmosphere to obtain an anti-glare layer with thickness of 6.27 μm. The obtained anti-glare film was observed by scanning electron microscope (SEM) with magnification ratio of 10,000 times and the average thickness of the miscible sub-layer was measured to be 4.29 μm.

The optical property measurement and the anti-glare evaluation of the obtained anti-glare film were conducted in accordance with the procedures in Example 1. The results were listed in Table 1.

Example 17

Preparation of Anti-Glare Film

The procedures of this Example were the same as Example 16, except for that the binder resin I was replaced by the binder resin III prepared in Preparation Example 3.

The anti-glare solution was coated on a PMMA base film with a thickness of 40 μm. The coated film was heated in 100° C. oven until the temperature of the film surface was reached 96° C. and then, the coated film was cured by exposing to UV light in an amount of 80 mJ/cm$^2$ under nitrogen atmosphere to obtain an anti-glare layer with thickness of 6.30 μm. The obtained anti-glare film was observed by scanning electron microscope (SEM) with magnification ratio of 10,000 times and the average thickness of the miscible sub-layer was measured to be 4.58 μm.

The optical property measurement and the anti-glare evaluation of the obtained anti-glare film were conducted in accordance with the procedures in Example 1. The results were listed in Table 1.

Optical Property Measurement

The optical properties of the anti-glare film obtained from the Examples were measured according to JIS test methods.

The light transmittance was measured according to the test method of JIS K7361 by NDH-2000 Haze Meter (manufactured by Nippon Denshoku Industries, Japan).

The haze was measured according to the test method of measuring the haze specified in JIS K7136 by NDH-2000Haze Meter (manufactured by Nippon Denshoku Industries, Japan).

The inner and outer haze measure was measured by bonding a triacetyl cellulose film (T40UZ, thickness: 40 μm, obtained from Fiji Film, Japan) to the uneven surface of the tested anti-glare film by transparent optical adhesive and using NDH-2000 Haze Meter (manufactured by Nippon Denshoku Industries, Japan) in accordance with the test method of measuring the haze specified in JIS K7136 to obtain the inner haze of the anti-glare film. The outer haze is determined by deducting the inner haze from the total haze.

The gloss measurement was determined by bonding a black acrylic plate to the anti-glare film with an adhesive and using a BYK Micro-Gloss meter in accordance with the test method of JIS Z 8741 to measure the glosses at 20-degrees, 60-degrees and 85-degrees.

The anti-glare property of the anti-glare film was evaluated by adhered a black acrylic plate to the back surface of the anti-glare film with a transparent adhesive. After that, two fluorescent lamps arranged in parallel were used as a light source. The two fluorescent lamps were reflected onto the surface of the anti-glare film and were visually evaluated by the five levels as below. As the haze of the anti-glare film was between 10% and 30%, the anti-glare property being at least Lv.3 was deemed to be qualified. As the haze of the anti-glare film was more than 30%, the anti-glare property being at least Lv.4 was deemed to be qualified.

Lv.1: the fluorescent lamps can be clearly seen as two separate lamps and the contour of the lamps can be linearly, clearly, and visually perceived;

Lv.2: the fluorescent lamps can be clearly seen as two separate lamps and the contour of the lamps can be seen;

Lv.3: the fluorescent lamps can be seen as two separate lamps and the contour of the lamps can be discriminated;

Lv.4: the fluorescent lamps can be visually perceived as two lamps, the contour of the lamps cannot be discriminated;

Lv.5: the fluorescent lamps cannot be seen as two separate lamps and the contour of the lamps cannot be discriminated either.

The anti-glare film based on PMMA base film obtained from the Examples 1 to 17 can provided satisfied optical properties, such as haze, glossiness and anti-glare, without sacrificing the thickness of the anti-glare layer.

While the invention has been described by way of example(s) and in terms of the embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An anti-glare film comprising:
a poly(methyl methacrylate) (PMMA) base film; and
an anti-glare layer comprising an acrylic binder resin and organic microparticles, wherein the acrylic binder resin comprising a (meth)acrylate composition and an initiator, and the (meth)acrylate composition comprises:
35 to 50 weight parts of an urethane (meth)acrylate oligomer with a functionality of 6 to 15;
12 to 20 weight parts of a (meth)acrylate monomer with a functionality of 3 to 6; and
1.5 to 12 weight parts of a (meth)acrylate monomer with a functionality of less than 3;
wherein the anti-glare layer comprises an miscible sub-layer adjacent to the interface between the anti-glare layer and the base film for urging the organic microparticles toward the upper portion of the anti-glare layer to form an anti-glare sub-layer with an uneven surface; and
wherein the average thickness of the miscible layer is at least 40 percent of the total thickness of the anti-glare layer.

2. The anti-glare film as claimed in claim 1, wherein the ratio of the average thickness of the anti-glare sub-layer to the diameter of the microparticle is in the range of 0.45 to 1.1.

3. The anti-glare film as claimed in claim 1, wherein the thickness of the anti-glare layer is in the range of 4 μm to 10 μm.

TABLE 1

The optical properties of the anti-glare film of Examples 1 to 17

| Example | Light Transmittance (%) | Total Haze (%) | Inner Haze (%) | Outer Haze (%) | Glossiness @20° | Glossiness @60° | Glossiness @85° | Anti-glare | Pencil Hardness |
|---|---|---|---|---|---|---|---|---|---|
| Example 1 | 91.9 | 7.7 | 4.9 | 2.7 | 57.1 | 82.1 | 88.4 | Lv. 2 | 2H |
| Example 2 | 91.9 | 2.9 | 1.3 | 1.6 | 37.7 | 73.5 | 91.3 | Lv. 2 | 2H |
| Example 3 | 91.7 | 2.8 | 1.6 | 1.2 | 41.5 | 75.9 | 90.3 | Lv. 3 | 2H |
| Example 4 | 91.7 | 3.3 | 1.2 | 2.1 | 50.9 | 79.5 | 91.1 | Lv. 2 | 2H |
| Example 5 | 91.9 | 4.1 | 2.1 | 2.0 | 59.9 | 83.7 | 92.7 | Lv. 2 | 2H |
| Example 6 | 91.5 | 7.9 | 1.7 | 6.2 | 23.2 | 61.9 | 87.8 | Lv. 3 | 2H |
| Example 7 | 91.8 | 3.7 | 0.9 | 2.8 | 44.2 | 75.8 | 91.3 | Lv. 2 | 2H |
| Example 8 | 91.9 | 2.4 | 1.2 | 1.2 | 56.0 | 80.9 | 93.0 | Lv. 2 | 2H |
| Example 9 | 91.8 | 2.7 | 1.2 | 1.5 | 47.4 | 78.2 | 93.1 | Lv. 2 | 2H |
| Example 10 | 91.1 | 42.2 | 7.7 | 34.5 | 4.7 | 30.2 | 65.2 | Lv. 5 | 2H |
| Example 11 | 91.9 | 17.9 | 11.9 | 6.0 | 31.6 | 73.7 | 91.7 | Lv. 3 | 2H |
| Example 12 | 91.7 | 20.8 | 15.2 | 5.6 | 28.7 | 67.0 | 89.4 | Lv. 3 | 2H |
| Example 13 | 91.9 | 27.7 | 21.7 | 6.0 | 25.6 | 66.6 | 90.3 | Lv. 3 | 2H |
| Example 14 | 91.5 | 45.3 | 36.1 | 9.2 | 7.1 | 36.5 | 79.6 | Lv. 4 | 2H |
| Example 15 | 91.0 | 21.9 | 4.3 | 17.6 | 9.9 | 41.9 | 87.9 | Lv. 4 | 2H |
| Example 16 | 92.0 | 41.8 | 32.4 | 9.4 | 14.7 | 56.5 | 90.2 | Lv. 3 | 2H |
| Example 17 | 92.1 | 46.8 | 34.4 | 12.5 | 8.0 | 43.2 | 86.5 | Lv. 4 | 2H |

4. The anti-glare film as claimed in claim 3, wherein the thickness of the anti-glare layer is in the range of 5 μm to 9 μm.

5. The anti-glare film as claimed in claim 1, wherein the average thickness of the anti-glare sub-layer is in the range of 0.5 μm to 5 μm.

6. The anti-glare film as claimed in claim 5, wherein the average thickness of the anti-glare sub-layer is in the range of 1 μm to 4 μm.

7. The anti-glare film as claimed in claim 1, wherein the average diameter of the organic microparticles is in the range of 0.5 μm to 6 μm.

8. The anti-glare film as claimed in claim 1, wherein the amount of the organic microparticles is in the range of 0.3 weight parts to 14 weight parts with respect to per 100 weight parts of the acrylic binder resin.

9. The anti-glare film as claimed in claim 1, wherein the urethane (meth)acrylate oligomer with a functionality of 6 to 15 is an aliphatic urethane (meth)acrylate oligomer.

10. The anti-glare film as claimed in claim 1, wherein the (meth)acrylate monomer with a functionality of 3 to 6 is selected from at least one of the group consisting of pentaerythritol tetra(meth)acrylate, dipentaerythritol penta(meth)acrylate (DPP(M)A), dipentaerythritol hexa(meth)acrylate (DPH(M)A), trimethylolpropane tri(meth)acrylate (TMPT(M)A), ditrimethylolpropane tetra(meth)acrylate (DTMPT(M)A) and pentaerythritol tri(meth)acrylate (PET (M)A), or combinations thereof.

11. The anti-glare film as claimed in claim 1, wherein the (meth)acrylate monomer with a functionality of less than 3 is selected from at least one of the group consisting of 2-ethylhexyl (meth)acrylate (2-EH(M)A), 2-hydroxyethyl (meth)acrylate (2-HE(M)A), 2-hydroxypropyl (meth)acrylate (2-HP(M)A), 2-hydroxybutyl (meth)acrylate (2-HB(M)A), 2-butoxyethyl (meth)acrylate, 1,6-hexanediol di(meth)acrylate (HDD(M)A), cyclic trimethylolpropane formal (meth)acrylate (CTF(M)A), 2-phenoxyethyl (meth)acrylate (PHE(M)A), tetrahydrofurfuryl (meth)acrylate (THF(M)A), lauryl (meth)acrylate (L(M)A), diethylene glycol di(meth)acrylate (DEGD(M)A), dipropylene glycol di(meth)acrylate (DPGD(M)A), tripropylene glycol di(meth)acrylate (TPGD(M)A) and isobornyl (meth)acrylate (IBO(M)A), or combinations thereof.

12. The anti-glare film as claimed in claim 1, wherein the initiator is selected from at least one of the group consisting of acetophenones, diphenylketones, propiophenones, benzophenones, α-hydroxyketones and fluorenylphosphine oxides, or combinations thereof.

13. The anti-glare film as claimed in claim 1, wherein the organic microparticles comprises polymethyl methacrylate microparticles, polystyrene microparticles, styrene-methyl methacrylate copolymer microparticles, polyethylene microparticles, epoxy resin microparticles, polysilicone microparticles, polyvinylidene fluoride or polyvinyl fluoride microparticles.

14. The anti-glare film as claimed in claim 1, wherein the anti-glare layer further comprises a plurality of silica nanoparticles.

15. The anti-glare film as claimed in claim 14, wherein the primary particle diameter (d50) of the silica nanoparticles is in the range of 5 nm to 120 nm.

16. A polarizer comprising a polarizing element, wherein the surface of the polarizing element comprises the anti-glare film as claimed in claim 1.

* * * * *